(12) United States Patent
Bouraoui et al.

(10) Patent No.: US 6,446,182 B1
(45) Date of Patent: Sep. 3, 2002

(54) METHOD FOR A MEMORY ORGANIZATION BY PHYSICAL ZONES IN A COMPUTERIZED OR DATA PROCESSING MACHINE OR ARRANGEMENT AND THE COMPUTERIZED OR DATA PROCESSING MACHINE OR ARRANGEMENT FOR USING THE METHOD

(75) Inventors: Nadia Bouraoui, Varces; Jean-Pascal Mazzilli, Eybens, both of (FR)

(73) Assignee: Bull SA, Louveciennes Cedex (FR)

( * ) Notice: Subject to any disclaimer, the term of this patent is extended or adjusted under 35 U.S.C. 154(b) by 0 days.

(21) Appl. No.: 09/470,953

(22) Filed: Dec. 23, 1999

(30) Foreign Application Priority Data

Dec. 28, 1998 (FR) .............................................. 98 16486

(51) Int. Cl.$^7$ .............................................. G06F 12/00
(52) U.S. Cl. ........................ 711/170; 711/159; 711/165; 409/104
(58) Field of Search ............................ 711/1, 114, 147, 711/160, 3, 202, 203, 171, 170; 709/104

(56) References Cited

U.S. PATENT DOCUMENTS

| | | | |
|---|---|---|---|
| 4,279,014 A | | 7/1981 | Cassonnet et al. .......... 711/206 |
| 4,511,964 A | * | 4/1985 | Georg et al. ................. 711/202 |
| 4,942,541 A | * | 7/1990 | Hoel et al. .................. 358/1.16 |
| 4,967,353 A | * | 10/1990 | Brenner et al. ............. 711/160 |
| 5,117,350 A | * | 5/1992 | Parrish et al. ................. 711/1 |
| 5,129,070 A | | 7/1992 | Dorotte ....................... 711/209 |
| 5,193,172 A | * | 3/1993 | Arai et al. ................... 709/104 |
| 5,218,687 A | | 6/1993 | Ducousso et al. .......... 711/128 |
| 5,283,876 A | | 2/1994 | Tague ......................... 711/207 |
| 5,392,410 A | * | 2/1995 | Liu ............................... 711/3 |
| 5,404,485 A | * | 4/1995 | Ban ............................ 711/202 |
| 5,432,917 A | * | 7/1995 | Parikh ......................... 711/160 |
| 5,668,968 A | * | 9/1997 | Wu ............................... 711/3 |
| 5,708,790 A | * | 1/1998 | White et al. ................ 711/203 |
| 5,721,858 A | * | 2/1998 | White et al. ................ 395/413 |
| 5,784,614 A | | 7/1998 | Davis .......................... 709/102 |
| 5,860,141 A | * | 1/1999 | Washington et al. ........ 711/202 |
| 5,930,830 A | * | 7/1999 | Mendelson et al. ......... 711/171 |

OTHER PUBLICATIONS

Harty, K. et al. "Application–Controlled Physical Memory using External Page–Cache Management" ACM Sigplan Notices, vol. 27, No. 9, Sep. 1, 1992, pp. 187–197.

Krueger, K. et al. "Tools for the Development of Application–Specific Virtual Memory Management" ACM Sigplan Notices, vol. 28, No. 10, Oct. 1, 1993, pp. 48–64.

* cited by examiner

*Primary Examiner*—David Hudspeth
*Assistant Examiner*—Fred F. Tzeng
(74) *Attorney, Agent, or Firm*—Nils H. Ljungman & Associates

(57) ABSTRACT

In executing data processing operations, a data processing system has a physical memory that is divided into a plurality of physical memory zones, each corresponding to a contiguous series of physical page numbers (NPP). A physical memory allocation method, in response to a request from a current process, activates a first function (Resa) which checks the number of available pages in a memory zone that iii distinguished from other memory zones by a name (z) specified by the current process and places the current process in a queue that corresponds to the zone designated (z) if the number of available pages is not sufficient in the zone designated (z), and then activates a second function (Allocate) which extracts a physical page number (NPP) from a list of available pages in the zone identified by the name (z) so that it can be used by the current process.

17 Claims, 6 Drawing Sheets

METHOD FOR A MEMORY ORGANIZATION BY PHYSICAL ZONES IN A COMPUTERIZED OR DATA PROCESSING MACHINE OR ARRANGEMENT AND THE COMPUTERIZED OR DATA PROCESSING MACHINE OR ARRANGEMENT FOR USING THE METHOD

BACKGROUND OF THE INVENTION

1. Field of the Invention

The field of the invention is the allocation of physical memory to processes executed by a computerized machine.

2. Background Information

The physical memory of a computerized or data processing machine or arrangement is conventionally divided into physical pages, each of which contains the same number of eight-bit bytes. A process accesses an eight-bit byte by means of an address, of which, for example, the most significant such as the high-order or general left-end bits encode a physical page number and the least significant such as the low-order or right-end bits encode a displacement in the physical page to reach the eight-bit byte accessed.

To run a process, a certain number of physical pages are allocated to the process. The physical pages allocated to a process are selected from a list of available pages, i.e. of pages that are not already being used, for example, by another process. A virtual addressing space makes it possible to allocate only a limited number of physical pages that are actually necessary at a given moment of the execution of the process. A virtual memory manager then establishes a correspondence between a virtual page number that is being accessed by the process and a physical page number selected from the list of available pages.

In similar systems, the allocation of physical pages is carried out on the basis of the totality of the physical memory by means of a single list of available pages. When a process requests access to a physical page other than one of those that are already allocated to it, and when the number of physical pages in the list of available pages is not sufficient to satisfy this request, the process is placed in a queue. A special replacement process in then activated to generate the available pages among the pages in use, taking care to back up the contents of the used pages that are replaced. When the number of available pages is once again sufficient, the processes placed in the queue are re-activated.

However, the method used in similar systems has a number of disadvantages. When a plurality of processes are being executed by the machine simultaneously, the list of available pages constitutes a bottleneck, because it can only be accessed by one process at a time. When the list of available pages does not contain a sufficient number of available pages, numerous processes may end up in the queue. When the list of available pages once again contains a sufficient number of available pages, the processes in the queue compete for them again, so that the losing processes are once again placed in the queue. The result is that an increase in the size of the physical memory or an increase in the number of processors in the machine does not result in the expected improvement of performance

OBJECTS OF THE INVENTION

An object of the invention is to eliminate the disadvantages discussed above.

Another object of the invention is a process for the allocation of physical memory to the processes being run by a computerized or data processing machine that has a physical memory (64, 74, 84, 94) that is divided into a plurality of physical memory zones, each corresponding to a contiguous series of numbers of physical pages (NPP).

SUMMARY OF THE INVENTION

The process, on request from a process being executed, activates:

a first function that verifies a number of available pages in a memory zone that is distinguished from the other memory zones by a name (z) specified by the current process, and places said current process in a queue corresponding to said zone designated (z) if the number of available pages is not sufficient in said zone designated (z);

a second function that retrieves a physical page number from a list of available page numbers in said zone distinguished by the name (z) so that it can be used by said current process.

Thus a plurality of physical memory zones can be managed independently, without the execution of processes in one physical memory zone interfering with the execution of processes in another physical memory zone.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The description of one particular embodiment of the invention follows, with reference to the accompanying figures, in which.

DESCRIPTION OF THE PREFERRED EMBODIMENT

Figure 1:
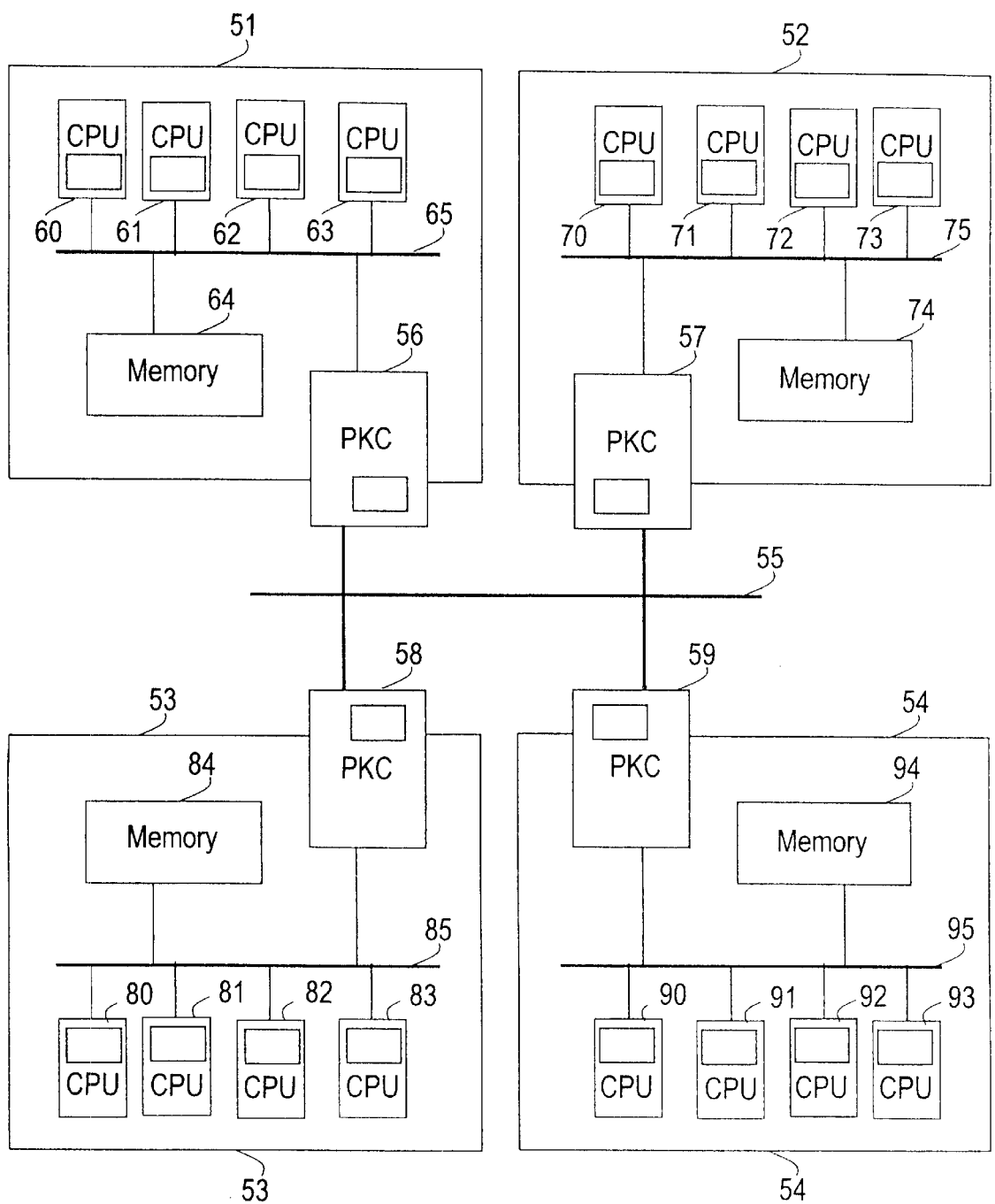
FIG. 1 illustrates a computerized or data processing machine.

With reference to FIG. 1, a computerized or data processing machine comprises a number n of modules operated by means of a common operating system (OS). A module 51 comprises one or more processors 60, 61, 62, 63 of the central processing unit (CPU) type and a memory unit 64 that is local to module 51. A module 52 comprises one or more processors 70, 71, 72, 73 of the central processing unit type and a memory unit 74 that is local to module 52. A module 53 comprises one or more processors 80, 81, 82, 83 of the central processing unit type and a memory unit 84 that is local to module 53. A module 54 comprises one or more processors 90, 91, 92, 93 of the central processing unit type and a memory unit 94 that is local to module 54. The example described above, where the number n is equal to four, is not restrictive, and the actual number of modules can be lower or higher.

Each module 51, 52, 53, 54 comprises respective interconnection mechanisms 56, 57, 58, 59, each of which interconnection mechanisms 56, 57, 58, 59 is indicated in FIG. 1 by the letters PKC. The interconnection mechanisms 56, 57, 58, 59 communicate physically among one another by means of a connection 55.

An assembly comprising all or part of the memory unit 64, all or part of the memory unit 74, all or part of the memory unit 84 and all or part of the memory unit 94 constitutes a set of physical memory resources MP for the operating system OS of the machine.

To access a resource in the physical memory MP, a processor 60, 61, 62, 63 located in the module 51 generates an access request via a bus 65 that is local to module 51. The access request includes a physical address AP of the resource. When the physical address AP is detected on the bus 65, the interconnection unit 56 physically takes control of the bus 65 to analyze the physical address AP. If the physical address AP is that of a resource that resides in the memory unit 64, and if this resource is up to date, the interconnection unit 56 leaves to the memory unit 64 the responsibility for transmitting the required resource via the bus 65 to respond to this request. Otherwise the interconnection mechanism 56 undertakes transmission of the required resource via the bus 65. If the interconnection unit 56 does not have the required resources locally in the module 51, the interconnection unit 56 in turn generates an access request on the link 55. The interconnection unit 57, 58, 59 or the respective remote modules 52, 53, 54 which has the required resource transmits it to the interconnection unit 56.

The physical mechanism that has been described above is identical or preferably identical for each of the n modules 51, 52, 53, 54 of the machine. The explanations relative to the bus 65 above are transposed to a bus 75 for the components of the module 52, to a bus 85 for the components of the module 53, and to a bus 95 for the components of the module 54. This physical mechanism is invisible to the operating system OS which sees all of the physical memory MP resources by means of their physical addresses AP without making any distinction a priori between the location of these resources in a particular module.

Nevertheless, the time taken by the physical mechanism to respond to an access request generated by a processor that is local to a module is shorter if the resource required is available locally in this module than if the required resource is available in a distant module. That is why the physical memory MP is said to have non-uniform access.

A physical address accessed by a process consists of a physical page number NPP and by a numeric shift in the physical page accessed. Thus, an access to an address directly in the physical addressing mode or indirectly via a virtual-real conversion mechanism in the virtual addressing mode results in access to a physical page number NPP.

The memory units 64, 74, 84, 94 are divided into physical memory zones. One or more physical memory zones are assigned to each memory unit. A contiguous series of physical page numbers NPP in assigned to each memory zone.

Numerous virtual-real correspondence mechanisms are known, such as those described in U.S. Pat. No. 4,279,014 (J.-C. Cassonnet et al.), U.S. Pat No. 5,129,070 (M. Dorotte), U.S. Pat. No. 5,283,876 (T. Steven) or U.S. Pat. No. 5,218,687 (P. Vallet et al.). Generally, the virtual-real correspondence uses a memory manager that consists of a hardware part and a software part. The hardware part contains tables that are resident in the main memory, specialized registers that are resident in the processors and hard-wired or micro-programmed instructions dedicated to accessing these tables and these registers. The software part comprises sequences of instructions that are triggered by events and executed by the processors. As one example of an event, it is possible to cite the page faults that occur when the hardware part accesses a page number without virtual-real correspondence. The software portion also accesses all or some of the tables of the hardware part. The elements of the memory manager useful for the understanding of the invention are explained with reference to the accompanying figures.

Figure 2:
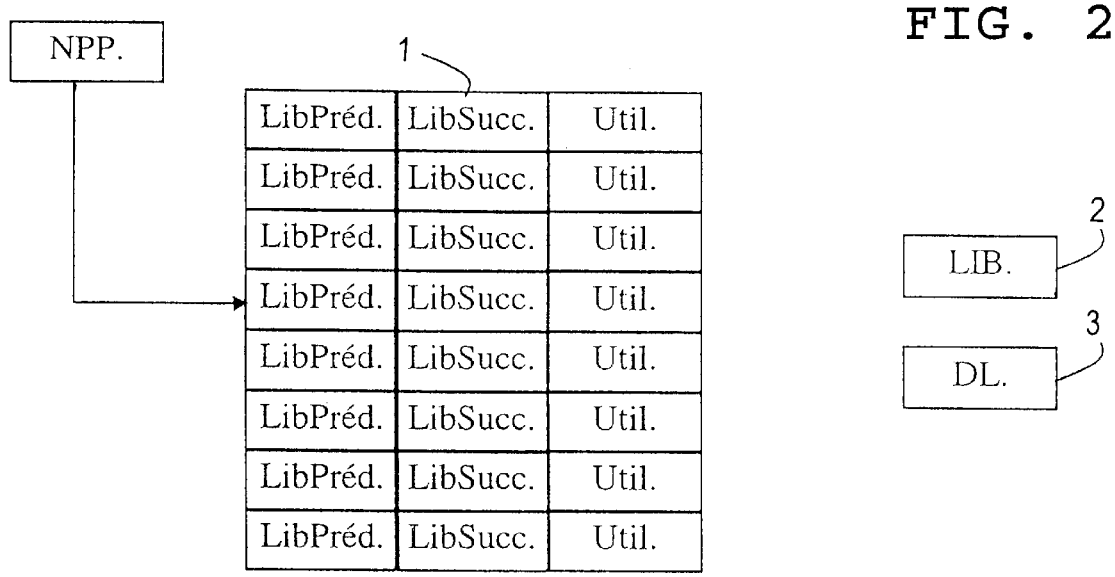
FIG. 2 illustrates a data structure for the implementation of the invention.
Figure 2:
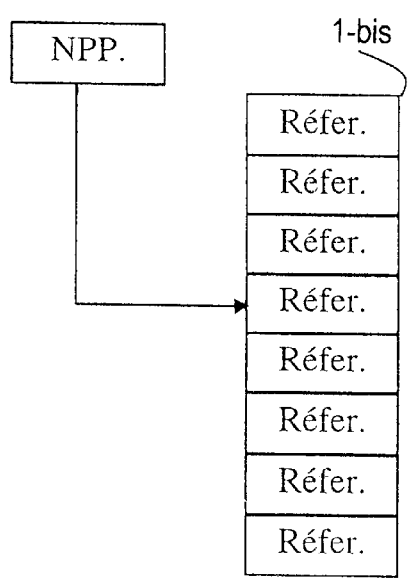
Figure 2:
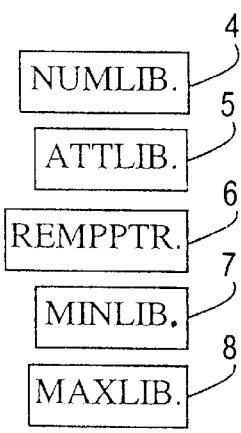
Figure 3:
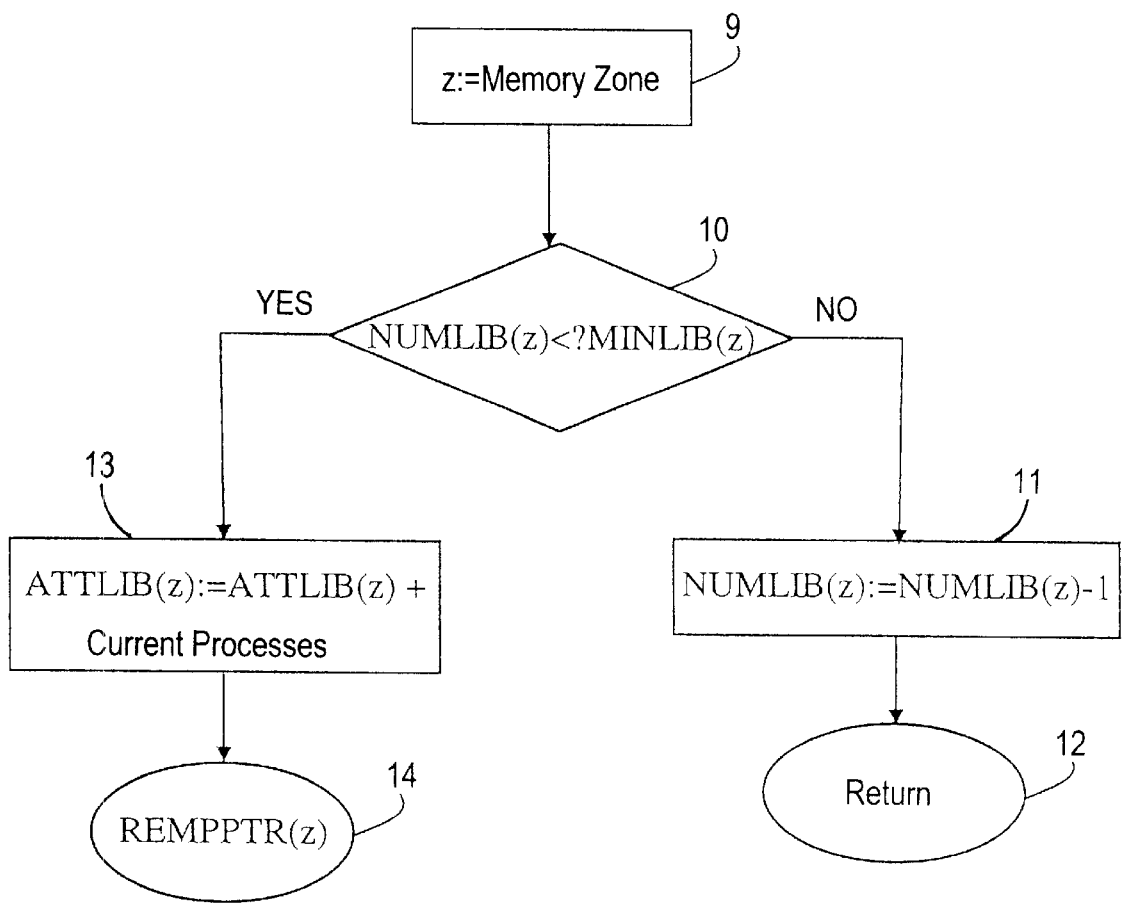
FIG. 3 is a flow chart of a physical page number reservation function.

With reference to FIG. 2, two data structures are associated with each physical memory zone. The first data structure includes a physical page management table 1 by the software part of the memory manager, a list header word 2 and a list end word 3. The data structure resides in the memory zone with which it is associated and is used to feed the allocator of the physical pages that are included in this memory zone. Table 1 begins at an address Ad1 of the memory zone and contains as many lines as the memory zone contains physical pages. Corresponding with each physical page number NPP is a line referenced by the physical page number in question. Each line contains three fields, among other things. Two of these fields are occupied only if the physical page in question is not part of the pages used in the virtual-real correspondence mechanism, to obtain a doubly chained list of the pages available in the memory zone in question. The first field is designed to contain a physical page number LibPred preceding the physical page number NPP in question in the list of available pages of the memory zone associated with the table 1. The first field is accessed by means of a function LibPred. (NPP) or LibPred.(NPP), which given the predecessor or the physical page number NPP in question in the list of available pages in the memory zone associated with table 1. The second field is designed to contain a physical page number LibSucc following the physical page number NPP in question in the list of available pages in the memory zone associated with the table 1. The second field is accessed by means of a function LibSucc.(NPP) which gives the successor of the physical page number NPP in question in the list of available pages in the memory zone associated with the table 1. The third field, for its part, is designed to contain an indicator Util which describes the utilization of the physical page NPP. The third field is accessed by means of a function Util.(NPP) which gives a value 1 if the physical page NPP is being used in the virtual-real correspondence mechanism, and a value 0 if the physical page NPP is available, and thus belongs to the list of the available pages of the memory zone associated with the table 1.

By way of example, if the pages numbers 1, 3 and 6 are the only pages available in the memory zone in question, LibSucc.(1) has a value of 3, Lib.Succ.(3) has a values of 6 and Lib.Succ.(6) has a value of the list endpoint indicator EXT. LibPred.(5) has a value of 3, LibPred.(3) has a value of 1 and LibPred.(1) has a value of the list endpoint indicator EXT. Util.(1), Util.(3) and Util.(6) have a value of 0. Util.(NPP) has a value of 1 for any other physical page NPP that has a number other than 1, 3 or 6.

The word 2 is designed to contain it first physical page number LIB not used by the virtual-real correspondence mechanism. The word 3 is designed to contain a last physical page number DL not used by the virtual-real correspondence mechanism. Corresponding to each memory zone designated z there are two words 2 and 3. The values contained in these two words will be called LIB(z) and DL(z), to identify the memory zone z to which they relate. Thus, with reference to FIG. 1, LIB(51) characterizes the first physical page number in the memory space 64 not yet used by the virtual-real correspondence mechanism. Likewise, with reference to FIG. 1, DL(51) designates the last physical page number in the memory space 64 not used by the virtual-real correspondence mechanism.

With reference to the preceding example, if the memory zone in question has the number z, LIB(z) has a value of 1 and DL(z) has a value of 6.

Initially, the value LIB(z) contained in the word 2 associated with the memory zone z contains a number that references the first physical page of the, memory zone z, and the value DL(z) contained in the word 3 associated with the memory zone z contains a number that references the last physical page of the memory zone z. The first field of each line of the table 1, with the exception of the first line, contains a number that references the preceding line of the table 1. The first field of the first line of the table 1 contains a list endpoint indicator EXT. The second field of each line of the table 1, with the exception of the last line, contains a number that references the following line of the table 1. The second field of the last line of the table 1 contains the list endpoint indicator EXT. The third field of each line of table 1 has a value of 0. Thus, before the utilization of physical pages by the virtual-real correspondence mechanism, all of the physical page numbers of the memory zone that reference a line in table 1 constitute a list of available physical page numbers that begins with the number contained in the word 2 associated with the memory zone in question and ends with the number contained in the word 3 associated with the memory zone in question.

The second data structure comprises the words 4, 5, 6, 7 that are used to manage the replacement of pages in the event of the saturation of the memory zone managed by this data structure. This data structure resides in the memory zone with which it is associated. The word 4 is designed to contain the total number of available physical pages NUMLIB in the memory zone managed. The word 5 in designed to contain an index ATTLIB to a list of processes pending the release of a physical page in the memory zone managed. The word 6 is designed to contain an index REMPPTR to the process in charge of the replacement of physical pages in the memory zone managed. The word 7 is designed to contain the limit value MINLIB of available pages below which the memory zone managed is considered saturated. The word 8 is designed to contain the limit value MAXLIB of available pages below which the memory zone managed is no longer considered saturated. Five words 4 to 8 are attributed to each memory zone designated z. The values contained in these words will be called NUMLIB(z), ATTLIB(z), REMPPTR (z), MINLIB(z) and MAXLIB(z), to distinguish the memory zone z to which they relate. Thus, with reference to FIG. 1, NUMLIB(51) designates the number of available pages in the memory zone 64. Likewise, with reference to FIG. 1, ATTLIB(51) designates the list of processes awaiting the release of a physical page in the memory zone 64. Still with reference to FIG. 1, REMPPTR(51) designates the process responsible for the replacement of physical pages in the memory zone 64 and being executed on one of the processors 60 to 63. Still with reference to FIG. 1, MINLIB(51) contains the limit value of the available pages below which the process indexed by REMPPTR(51) will be activated. Still with reference to FIG. 1, MAXLIB(51) contains the limit value of pages released beyond which REMPPTR(51) will stop its page replacement process.

Initially, the word 4 contains the total number of physical pages contained in the memory zone managed, and the word 5 contains a value zero, and no process is awaiting the release of a page. The words 6 to 8 contain invariable values for a given memory zone.

A third data structure comprises a table 1-bis for management of the physical pages both for the software part and for the hardware part of the memory manager. The data structure resides in the memory zone with which it is associated and is used among other things by the page replacement process in case of saturation of this memory zone. The table 1-bis begins at an address Ad1-bis of the memory zone, and contains as many lines as the memory zone contains physical pages. Corresponding to each physical page number NPP in question there is a line referenced by the physical page number in question and containing, among other things, a field. This field is designed to contain an indicator Refer. or Refer. which describes the access to the physical page NPP. This field is positioned at 1 by the hardware part of the memory manager, once the physical page NPP is referenced, i.e. accessed in read or in write mode. This field is accessed by means of a function Refer. (NPP) which assumes a value 1 if the physical page NPP has been accessed and a value 0 if the physical page NPP has not been accessed.

A reservation function Resa is described with reference to FIG. 2. The purpose of the Resa function is to reserve a physical page number so that it can be used by the virtual-real correspondence mechanism. To reserve a number N of physical pages, for example in the case of the creation of a process, the function Resa is polled successively N times.

A first step 9 consists of or comprises extracting the number of the memory zone in which the reservation is to be made. The number of the memory zone is determined on the basis of fixed rules by the polling application. These rules include an allocation in a preestablished fixed memory zone, the number supplied by said application, or an allocation that is designated "local", i.e. in the memory zone that belongs to the module that contains one of the processors on which the current process of said application is being executed, or an allocation that is designated "by distribution", i.e. in different memory zones for each new allocation of a physical page for the requirements of said application. If no particular action has been undertaken by the polling application, the memory zone is the one that belongs to the module that contains one of the processors on which the process of said application is currently being executed. Let z be the number of this memory zone.

A second step 10 consists of or comprises performing a test on the value NUMLIB(z) of the word 4 associated with the memory zone z. A value of NUMLIB(z) less than MINLIB(z) means that the memory zone z in saturated. A step 13 then adds the current process number in the list of processes ATTLIB(z) pending a release of a page in the memory zone z. Then a step 14 triggers the replacement process Remp, indexed by REMPPTR(z) to fill the list of available physical page numbers in the memory zone z. The replacement function Remp is described bellow.

A value of NUMLIB(z) greater than or equal to the value of MINLIB(z) means that the list of available physical page numbers consists of at least MINLIB(z) physical page numbers. A step 11 makes the reservation in the memory zone z, i.e. the value NUMLIB(z) is decreased by 1, 1 being the number of pages to he reserved. In step 12, a return is effected to the calling procedure, which will activate the effective allocation of the physical page.

Figure 4:
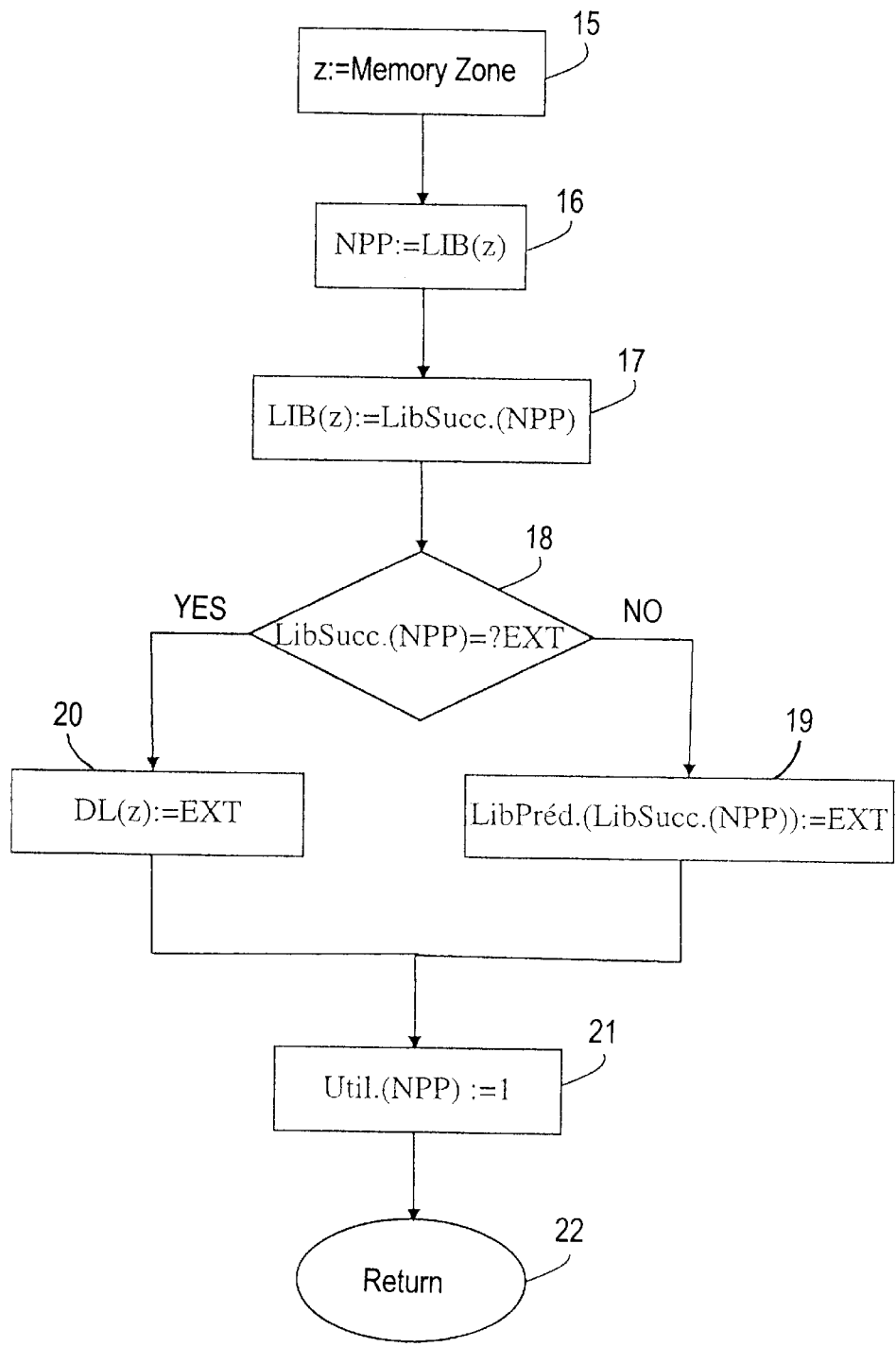
FIG. 4 in a flow chart of a physical page number allocation function.

An Allocator or Assign function is described with reference to FIG. 4. The purpose of the Allocate function is to assign a physical page previously reserved by the Resa function so that it can be used by the virtual-real correspondence mechanism. The purpose of this function is therefore to remove the first physical page from the list of available pages in one of the memory zones of the machine.

A first step 15 consists of or comprises extracting from a structure associated with the current processor the number of the memory zone in which the assignment must take place. This extraction is made in the same manner as that described above in the context of the Resa function. Let z be this memory zone number. A step 16 considers the physical page number NPP equal to the value LIB(z) contained in the word 2 associated with the memory zone z.

In step 17, the value of the word LIB(z) is replaced by the value of the second field of the line of the table 1, referenced by the physical page number NPP in question. Thus, the new number of the first available page in zone z is the successor of the accessed page number NPP in the list of available pages.

In step 18, a test is performed on the value of the second field of the table 1 at the line number referenced by the page number NPP to test whether the page number NPP was not at the end of the list of available pages. In such a case, its successor LibSucc.(NPP) has the endpoint indicator for a value. A negative response to the test triggers step 19.

In step 19, the endpoint indicator EXT is written in the first field of the table 1 at the line number referenced by the physical page number LibSucc.(NPP), the value of which is contained in the second field of the tablet 1 at the line number referenced by the page number NPP accessed. The purpose of this step is to definitively remove the physical page number NPP in question from the list of available physical page numbers of the memory zone z, which now begins at the successive physical page number of the list of available physical page numbers.

If the page number NPP is the only one in the list of the available physical pages of the memory zone z, its successor LibSucc.(NPP) in the endpoint indicator EXT. A negative response to the test in Step 18 triggers a step 20.

In step 20, if the physical page NPP does not have a predecessor in the list of available pages in zone z, the value DL(z) contained in the word 3 associated with the memory zone z is replaced by the endpoint indicator EXT. The purpose of this step is to empty the list of available pages in the memory zone z. The step 21 is triggered upon completion of Step 19 or Step 20.

Step 21 is triggered upon termination of Step 19 or Step 20. In this step, the indicator Util.(NPP) which is present in table 1, and which indicates whether a page is available or is being used is positioned at 1 to indicate that the physical page NPP is no longer available.

The step 22 makes it possible to return to the calling procedure.

Figure 5:
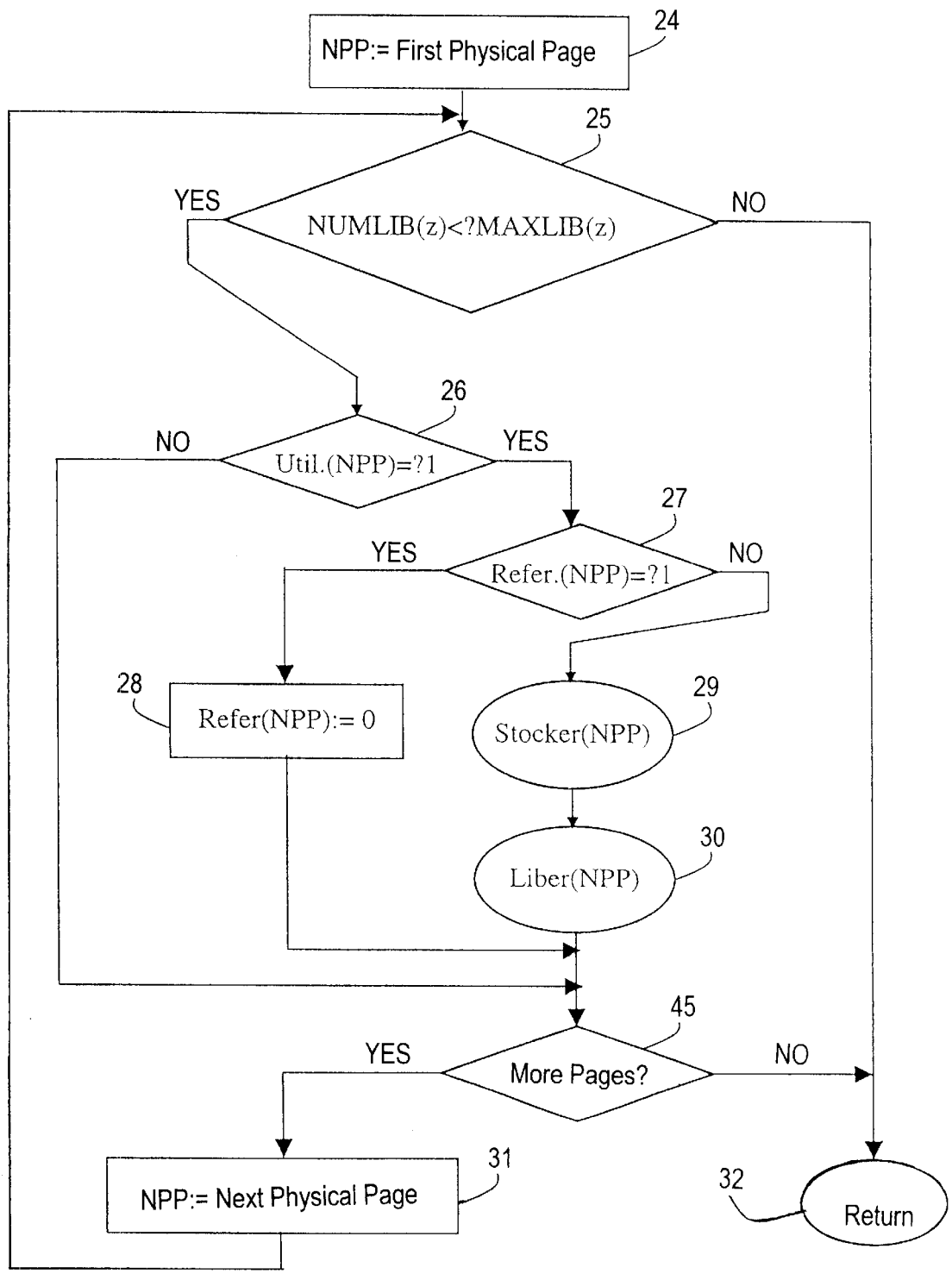
FIG. 5 is a flow chart of a physical page number replacement function.

The replacement function RAMP is described with reference to FIG. 5. It is called with, as a parameter, the number of the memory zone in which it should work. Let z be this memory zone number. The purpose of this function is to release physical pages in the memory zone z, these pages are selected among the physical pages that are occupied and not frequently referenced. The release of the pages must be made after their contents have been backed up in a storage apace in secondary memory.

A step 24 uses as the page number NPP the first physical page number of the memory zone z, i.e. the page referenced by the first line of the table 1.

In step 25, a loop begins which ends as soon as the value NUMLIB(z) that is present in the word 4 associated with the memory zone z and that designates the number of available pages in the memory zone z becomes greater than the value MAXLIB(z) present in the word 8 associated with the memory zone z.

If the test of step 25 is verified, the subsequent steps 27 to 30 process the pages in the memory zone z to try to release the desired number.

The step 26 tests whether the current physical page designated by NPP is available. This test in performed by testing the indicator Util.(NPP) present in the physical page management table 1. If Util.(NPP) does not have a value 1, that means that the page is already available, and thus there is no need to continue to process it. A step 45 is then activated directly. If Util.(NPP) has a value 1, it means that the physical page is not available, and therefore that it can be replaced. The step 27 then tests whether the physical page NPP is referenced. This test is performed by testing the indicator Refer.(NPP) present in the physical page management table 1-bis. If Refer.(NPP) has a value 1, that means that the physical page has been accessed recently by a process, and therefore it in no longer necessary to release it, in which case step 28 is then triggered. Otherwise, step 29 is triggered.

In step 28, the indicator Refer.(NPPT) is positioned at 0. Then, if the physical page NPP is again accessed before the next execution of the replacement function, the hardware will again position this indicator at 1. On the other hand, an absence of access will make it possible to keep this value zero of Refer. (NPP) and to indicate to the replacement function that the page has not been recently accessed, and thus that the page NPP can be replaced. The step 45 is triggered upon completion of the step 28.

If Refer.(NPP) has a value of 0, that means that the physical page has not been recently accessed, since the last execution of the replacement function. It is therefore possible to release it. In step 29, the function Store(NPP) is called up, which makes it possible to back up the contents of the physical page NPP in secondary memory, so that it can be restored later, if necessary.

In step 30, the effective release of the physical page NPP is activated by calling up the function Liber(NPP). The function Liber [Release] is described below. The step 45 is triggered upon completion of the step 28.

The step 45 is a test step to determine whether there are still pages in the memory zone in question. If the page number NPP references the last line of the table 1, there is no following page in the memory zone in question, and the step 32 is activated to terminate the replacement process. If there is a following line in the table 1, there are still pages and a step 31 is activated, The step 31 takes as the page number NPP the number following that which has just been considered in the memory zone z, i.e. the page referenced by the next line of the table 1. Then a return to step 25 takes place.

The step 32 is activated if the test: of step 25 is not verified, i.e. if the number of physical pages available in the memory zone z becomes greater or equal to the value MAXLIB(z) present in the word 8 associated with the memory zone z. The work of the replacement function is then considered finished, and the replacement function REMP is terminated by a return. To avoid promoting a systematic replacement of the physical page numbers listed at the beginning of table 1, it is possible to provide an additional step (not shown), which follows a negative response to the test in Step 25. This additional step consists of defining as the first physical page of the memory zone z for the step 24, the physical page number NPP obtained in step 31. Thus, a subsequent verification of the table 1 does not start systematically at the beginning of table 1, but at the line in table 1 for which the sufficient number of available pages has been obtained. The last physical page number NPP in table 1 is then defined for step 45 as being the one referencing the line preceding the current line.

Figure 6:
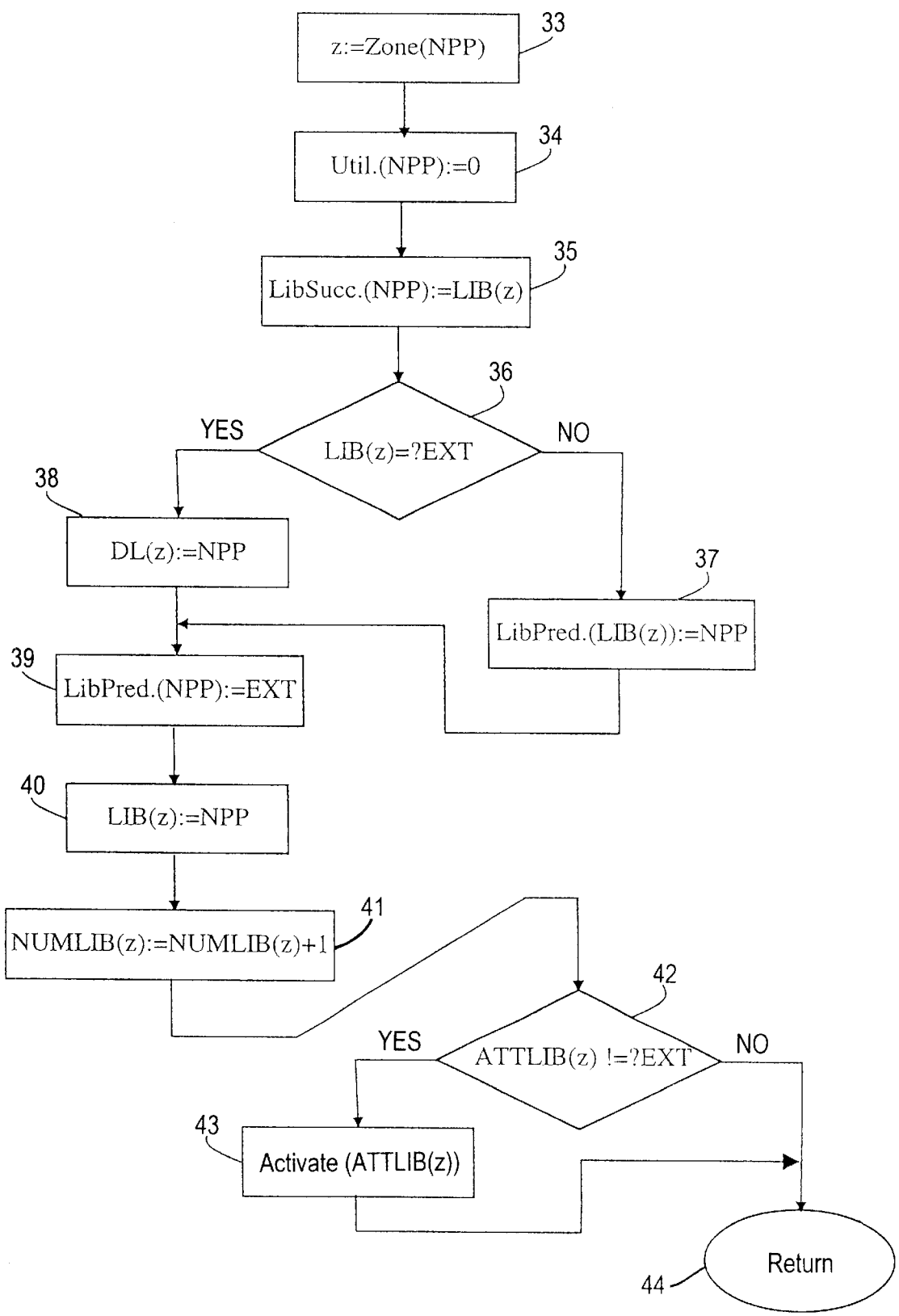
FIG. 6 is a flow chart of a physical page number release function.

A release function LIBER is described with reference to FIG. 6. The LIBER function is activated on each physical page number NPP that is no longer required by any process, for example at the end of a process, or following a polling after the replacement function REMP described above. The purpose of the LIBER function is to return such A page number NPP to the top of the list of available page numbers belonging to the memory zone where the physical page NPP originated.

In step 33, a zone(NPP) function is polled to search for the number of the memory zone of the machine where the physical page originated. Knowing that the ranges of contiguous physical addresses of the memory are associated with each zone, the zone number where the page NPP originated can be easily calculated by comparing the value NPP to each range of addresses until the system finds the address range that contains it, and then determines its location. It should be noted that other processes for the location of a physical page are conceivable, although that may not be the object of this invention, and is only or relatively a minor aspect of the invention described above. Let z be the memory zone number where the physical page NPP originates.

In step 34, the field Util.(NPP) in the physical page management table 1 that indicates that the physical page NPP is being used is reset to 0. This measure makes it possible to indicate that the physical page VPP is currently available.

In step 35, the value LIB(z) of the word 2 associated with the memory zone z is recorded in the second field in table 1 in the line number referenced by the page number NPP to be released, so that it indicates that the page number NPP is now the first one in the list of available page numbers and is therefore succeeded in the list of the available pages in memory zone z by the former first available page number in memory zone z.

In step 36, a test is performed on the value LIB(z) contained in the word 2 associated with the memory zone z. A value equal to the list endpoint indicator EXT means that the list of available page numbers was empty before the release of the page number NPP. A positive response to the test triggers step 38, in which the page number NPP is recorded an the value DL(z) of the word 3 associated with the memory zone z. That indicates that the page number NPP is the last available page number. A negative response to the test triggers step 37, in which the page number NPP is recorded in the first field of table 1, the line of which is referenced by the value LIB(z) contained in the word 2 associated with the memory zone z. That adds the page number NPP in the list of available pages, before the first available page number. Step 39 is initiated upon completion of step 38 or step 37.

In step 39, the list endpoint indicator EXT is recorded in the first field of table 1 in the line number referenced by the page number NPP to be released, to indicate that the page number NPP becomes the first in the list of available page numbers in the memory zone z, and therefore has no predecessor.

In step 40, the page number NPP is recorded as the new value LIB(z) in the word 2 associated with the memory zone z, to indicate that the page number NPP is the first available page number.

In step 41, the value NUMLIB(z) of the word 4 associated with the memory zone z designating the number of available pages in the memory zone z is increased incrementally.

In step 42, a test on the value ATTLIB(z) contained in the word 5 associated with the memory zone z designating the list of processes awaiting the release of a physical page in the memory zone z is performed. A different value of the endpoint indicator EXT means that there are processes awaiting the release of a physical page in the memory zone z. A positive response to the test triggers step 43, in which these processes are re-activated.

The return step 44 is triggered upon completion of stop 43 or a negative response to the test in step 42.

The structures and mechanisms that heave been described above are attractive for a machine architectures with non-uniform memory access. By defining one memory zone for each module of the machine with reference to FIG. 1, the operation of the virtual-real conversion mechanism in each memory zone independently makes it possible to reduce interactions with remote modules.

These structures and mechanisms are also attractive for an architecture with uniform memory access when the memory is of considerable size. That is the case, for example, for a machine consisting of only the module 51 in FIG. 1, which then does not have the interconnection unit 56. By defining a plurality of distinct memory zones in the memory unit 64, the operation of the virtual-real conversion mechanism in each memory zone independently makes it possible to reduce the interactions between memory zones. Thus, two distinct processes that are running in two different memory zones will not interfere with each other. A reservation by the first process in the first memory zone does not interfere with the second process in the second zone. The first process, while awaiting the assignment of physical pages in the first memory zone, does not interfere with the second process which is running in the second memory zone, because the replacement process does not usurp the physical pages in the second process to allocate them to the first process.

One feature of the invention resides broadly in the physical memory allocation method to processes executed by a computerized machine that has a physical memory 64, 74, 84, 94 that is divided into a plurality of physical memory zones, each corresponding to a contiguous series of physical page numbers NPP, characterized by the fact that the method, in response to a request from a running process, activates:

a first function Resa which checks the number of available pages in a memory zone that is distinguished from the other memory zones by a name z specified by the running process in a step 9 and places said running process in a queue that corresponds to said zone designated z if the number of available pages is not sufficient in said zone designated z, as detected in a step 10;

a second function Allocate which extracts a physical page number NPP from a list of available pages in said zone identified by the name z specified in a step 15 so that it can be used by said running process.

Another feature of the invention resides broadly in the physical memory allocation method characterized by the fact that the list of available pages is between a first data structure 1, 2, 3 with a reference for each physical page number NPP of said zone designated z.

Yet another feature of the invention resides broadly in the physical memory allocation method characterized by the fact that the verification of the number of available pages in a memory zone that is distinguished from the other memory zones by a name z is performed by means of a second data structure 4, 5, 6, 7, 8.

Still another feature of the invention resides broadly in the physical memory allocation method characterized by the fact that each access to a physical page number NPP in the memory zone designated z by any process is indicated by the status of a third data structure 1bis.

A further feature of the invention resides broadly in the physical memory allocation method characterized by the fact that following the placement of said running process in the queue corresponding to said zone designated z, the first function Resa triggers a function Remp which runs through the first data structure to consult, in a step 27, the status of the third data structure 1bis for each physical page number NPP detected in a step 26, used in the first data structure, and to modify any status indicating an access to a physical page number NPP until it detects a status indicating no access, which then, in a step 30, triggers a release function Liber to add the number NPP to the list of available pages.

Another feature of the invention resides broadly in the physical memory allocation method characterized by the fact that at least the first data structure is distinct for each physical memory zone and resides in the physical memory zone to which it is attributed.

Yet another feature of the invention resides broadly in the physical memory allocation method characterized by the fact that the release function LIBER, in a step 43, re-activates the processes contained in the list of processes ATTLIBz awaiting the release of a page in the memory zone z.

Still another feature of the invention resides broadly in the physical memory allocation method characterized by the fact that the release function LIBER begins with a step 33 which determines the name z of the memory zone to which the physical page with number NPP belongs, for which the function LIBER has been activated.

A further feature of the invention resides broadly in the computerized machine comprising a physical memory 64, 74, 84, 94 that is divided into a plurality of physical memory zones, each corresponding to a contiguous series of physical page numbers, characterized by the fact that it includes a physical memory:

a first data structure 1, 2, 3 to define a list of available physical page numbers NPP for each physical memory zone designated z;

a second data structure 4, 5, 6, 7 to verify the number of available pages in each list of available physical pages.

Another feature of the invention resides broadly in the computerized machine characterized by the fact that the second data structure includes a word 5 that is associated with each physical memory zone designated z, the word 5 pointing to a list ATTLIB of processes awaiting an available physical page in said physical memory zone designated z.

The following list of U.S. patents and publications is incorporated herein by reference as if set forth in their entirety herein as possible examples of disclosures of details of the present invention, and also as possible methods and/or structures in which the present invention and its various embodiments and details thereof could be utilized: U.S. Pat. No. 5,193,172, entitled "Memory Management System for Dispatching Only to a Selected High-Use-Priority Task a Maximum Allocated and Given Highest-Use-Priority Real-Pages When Requested", having the inventors Arai et al., issued Mar. 9, 1993; U.S. Pat. No. 5,784,614, entitled "Cache Affinity Scheduling Method for Multi-Processor Nodes in a Split Transaction Bus Architecture", issued Jul. 21, 1998, having the inventor Davis; Kieran Harty and David R. Cheriton, Computer Science Department, Stanford University, entitled "Application-Controlled Physical Memory Using External Page-Cache Management", 8398 ACM SIGPLAN NOTICES, Vol. 27, No. 9, Sep. 1, 1992, pages 187–197, XP000330600, ISSN: 0362–1340; and Keith Krueger et al., Computer Science Divsion, University of California-Berkeley, entitled "Tools for the Development of Application-Specific Virtual Memory Management", 8398 ACM SIGPLAN NOTICES, Vol. 28, No. 10, Oct. 1, 1993, pages 48–64, XP000411717, ISSN: 0362–1340.

The concepts computerized or data processing machine or arrangement may include general purpose and other computers.

The components disclosed in the various publications, disclosed or incorporated by reference herein, may be used in the embodiments of the present invention, ads well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with, at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publications corresponding to French Patent Application No. 98 16436, filed in France on Dec. 28, 1998, having the French title "Organisation mémoirs par zones physiques", having inventors Nadia Bouraoui (having the alternative name Nadia Bouraoui Derbey) and Jean-Pascal Mazzilli, which inventors have the addresses 4, rue Aristide Briand, 38320 Eybens, France (for Nadia Bouraoui, having the alternative name Nadia Bouraoui Derbey) and 25, rue Jean Moulin, 38320 Eybens, France (for Jean-Pascal Mazzilli), having the assignee BULL S. A., c/o Monsieur Jean-Marc DIOU, 68, route de Versailles, PC: 58F35, 78434 LOUVECIENNES Cedex, which assignee has the alternative address BULL S. A., 68, route de Versailles, 78430 LOUVECIENNES, France, as well as their published equivalents, and other equivalents or corresponding applications, if any, in corresponding cases in France and elsewhere, and the references cited in any of the documents cited herein, are hereby incorporated by reference as if met forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

To run processes, a computerized machine has a physical memory (64, 74, 84, 94) that is divided into a plurality of physical memory zones, each corresponding to a contiguous series of physical page numbers (NPP). A physical memory allocation process, in response to a request from a running process, activates:

a first function (Resa) which checks the number of available pages in a memory zone that is distinguished from the other memory zones by a name (z) specified by the running process in a step (9) and places said running process in a queue that corresponds to said zone designated (z) if the number of available pages is not sufficient in said zone designated (z), as detected in a step (10);

a second function (Allocate) which extracts a physical page number (NPP) from a list of available pages in said zone identified by the name (z) specified in a step (15) so that it can be used by said running process.

FIG. 2 shows the details of the immediately preceding paragraph.

The invention as described hereinabove in the context of the preferred embodiments is not to be taken as limited to all of the provided details thereof, since modifications and variations thereof may be made without departing from the spirit and scope of the invention.

What is claimed is:

1. A method for allocating physical memory to at least one computing process executed in a data processor system having a physical memory that is divided into a plurality of physical memory zones, each having physical pages assigned to respective, contiguous physical page numbers, the method comprising the steps of:

defining for each of said memory zones a list of available physical pages among said physical pages in the corresponding physical memory zone;

requesting from said at leas one process allocation of at least one available physical page in one of said memory zones;

determining, by said at least one process, a name for said one memory zone in order to distinguish it from the other ones;

activating a first function, said first function performing the steps of verifying whether at least one of said physical pages is available in said one memory zone and, if no page is available as a result of said verifying step, placing said at least one process in a queue that corresponds to said one memory zone; and activating a second function if at least one page is available as a result of said verifying step, said second function extracting a physical page number from said list of available pages in said one memory zone for use by said at least one process.

2. The method according to claim 1, further comprising defining for each of said memory zones a first value representative of the total number of said available physical pages in the corresponding memory zone and a second value representative of a limit below which the corresponding memory zone is considered saturated and wherein said verifying step of at least one available page in said one memory zone includes the step of testing between said first and second values.

3. The method according to claim 2, further comprising a first data structure including said list and a second data structure including said first and second values.

4. The method according to claim 1, further defining for each of said memory zones a table in which each physical page number in the corresponding memory zone corresponds to a status of a first value when the corresponding physical page has not been accessed by any process in said data processing system and of a second value when accessed by an process.

5. The method according to claim 4, wherein when said at least one process is placed in the queue corresponding to said one memory zone, the first function triggers a third function, said third function performing the steps of running through said list to detect at last one physical page that is not available, consulting in said table the status of the detected, not available physical page to detect said first value of said status, repeating said running step through the list and said consulting step to verify whether said physical page corresponding to said detected first value has been modified and, if not modified, triggering a release function to add the corresponding physical page number to the list of available pages.

6. The method according to claim 4, wherein said table resides in the corresponding physical memory zone.

7. The method according to claim 1, wherein said list resides in the corresponding physical memory zone.

8. The method according to claim 1, wherein said first and second values reside in the corresponding physical memory zone.

9. The method according to claim 1, wherein the step of activating said first and second functions is performed for each allocation of a physical page requested by said at least one process.

10. A data processing system comprising:

a physical memory that is divided into a plurality of physical memory zones, each having physical pages assigned to contiguous physical page numbers;

a list, for each of said memory zones, of available physical pages among said physical pages in the corresponding physical memory zone;

at least one process executed by the data processing system and requesting an allocation of at least one available physical pages in one of said memory zones;

a name determined by said at least one process for said one memory zone in order to distinguish it from the other ones;

means for performing a first function, said first function including the steps of verifying whether at least one of said physical pages is available in said one memory zone and, if no page is available as a result of said verifying step, placing said at least one process in a queue that corresponds to said one memory zone; and means activated if at least one page is available as a result of said verifying step for performing a second function, said second function extracting a physical page number from said list of available pages in said one memory zone for use by said at least one process.

11. The system according to claim 10, further comprising a data structure including a first value representative of the total number of said available physical pages in the corresponding memory zone and a second value representative of a limit below which the corresponding memory zone is considered saturated and wherein said means for performing said verifying step of at least one available page in said one memory zone includes means for testing between said first and second values.

12. The system according to claim 10, further comprising for each of said memory zones a table in which each physical page number in the corresponding memory zone corresponds to a status of a first value when the corresponding physical page has not been accessed by any process in said data processing system and of a second value when accessed by any process.

13. The system according to claim 12, wherein said table resided in the corresponding physical memory zone.

14. The system according to claim 10, further comprising means for performing a third function that is triggered by said first function when said at least one process is placed in the queue corresponding to said one memory zone, said third function performing the steps of running through said list to detect at least one physical page that is not available, consulting in said table the status of the detected, not available physical page to detect said first value of said status, repeating said running step through the list and said consulting step to verify whether said physical page corresponding to said detected first value has been modified and, if not modified, triggering a release function to add the corresponding physical page number to the list of available pages.

15. The system according to claim 10, wherein said list resides in the corresponding physical memory zone.

16. The system according to claim 10, wherein said first and second values reside in the corresponding physical memory zone.

17. A method for allocating physical memory to at least one computing process executed in a data processor system having a physical memory that is divided into a plurality of physical memory zones, each having physical pages assigned to respective, contiguous physical page numbers, said method comprising the steps of:

defining, for each of said memory zones, a list of available physical pages from said physical pages in each of said memory zones;

requesting, from said at least one process, allocation of at least one available physical page in one of said memory zones;

determining, by said at least one process, a name for said one memory zone in order to distinguish it from the other memory zones;

activating a first function, said first function performing the steps of verifying whether at least one of said physical pages is available in said one memory zone and, if no page is available as a result of said verifying step, placing said at least one process in a queue that: corresponds to said one memory zone; and activating a second function if at least one page is available as a result of said verifying step, said second function comprising the step of extracting a physical page number from said list of available pages in said one memory zone for use by said at least one process.

* * * * *

UNITED STATES PATENT AND TRADEMARK OFFICE
CERTIFICATE OF CORRECTION

PATENT NO. : 6,446,182 B1
DATED : September 3, 2002
INVENTOR(S) : Nadia Bouraqui and Jean-Pascal Massilli It is certified that error appears in the above-identified patent and that said Letters Patent is hereby corrected as shown below:

Column 7,
Line 4, after "to", delete "he" and insert -- be --.

Column 13,
Line 48, after the first occurrence of "at", delete "leas" and insert -- least --.

Column 14,
Line 16, after "by", delete "an" and insert -- any --.

Column 15,
Line 16, before "in", delete "resided" and insert -- resides --.

Column 16,
Line 24, after "that" delete ":".

Signed and Sealed this

Thirty-first Day of December, 2002

JAMES E. ROGAN
*Director of the United States Patent and Trademark Office*